No. 711,504. Patented Oct. 21, 1902.
C. W. JAMES.
MACHINE FOR FACING NUTS, &c.
(Application filed Feb. 8, 1902.)
(No Model.)
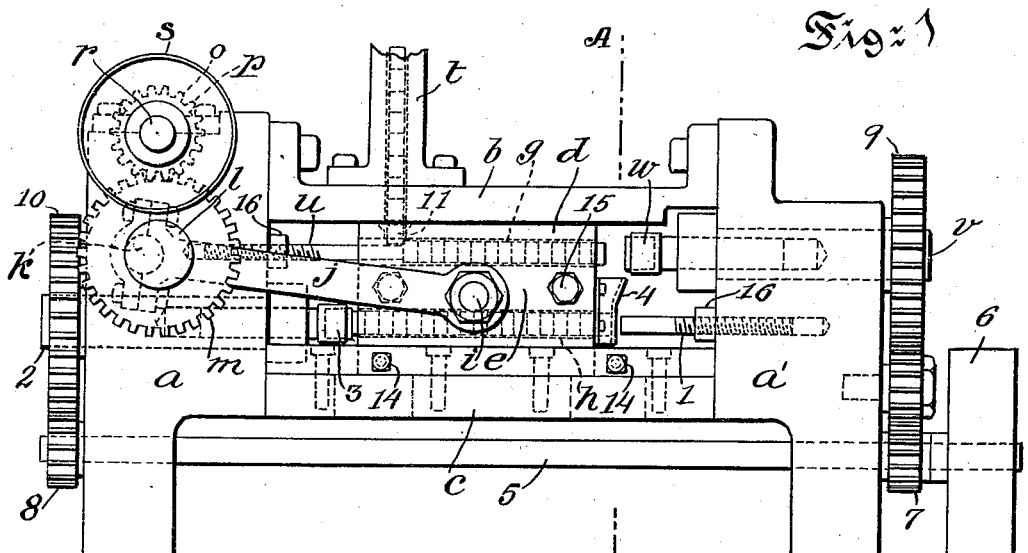
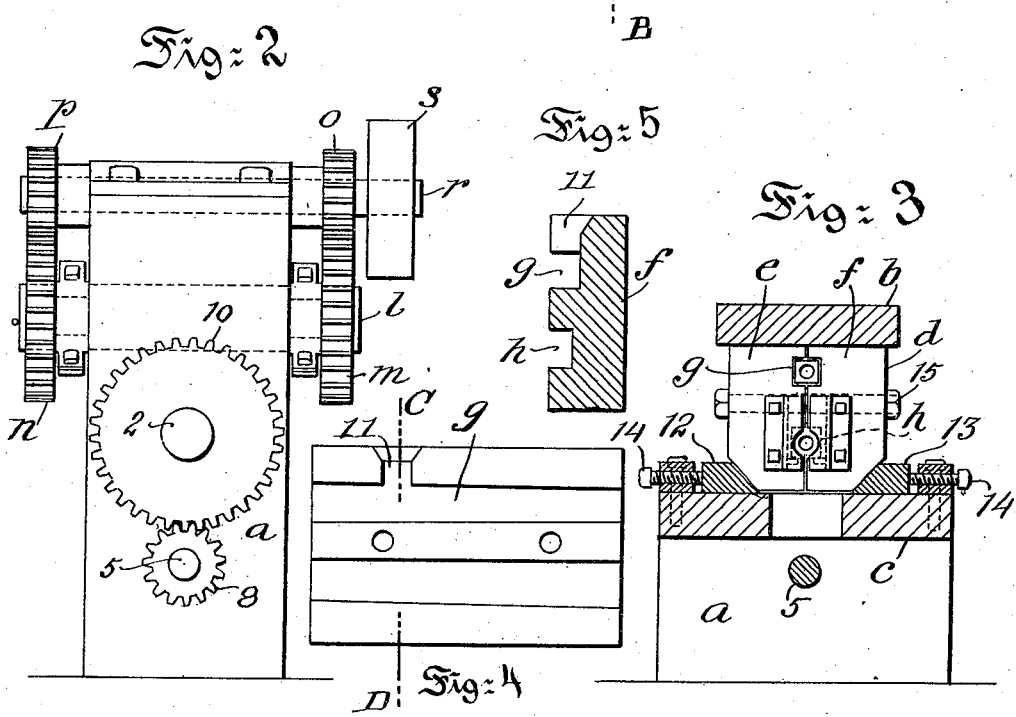
Witnesses:
W. A. Schafer.
Stevenson W. Welsh
Inventor.
Charles W. James.
By his Attorney Chas. A. Cutter.
THE NORRIS PETERS CO., PHOTO-LITHO., WASHINGTON, D. C.

UNITED STATES PATENT OFFICE.

CHARLES W. JAMES, OF PHILADELPHIA, PENNSYLVANIA.

MACHINE FOR FACING NUTS, &c.

SPECIFICATION forming part of Letters Patent No. 711,504, dated October 21, 1902.

Application filed February 8, 1902. Serial No. 93,185. (No model.)

*To all whom it may concern:*

Be it known that I, CHARLES W. JAMES, a citizen of the United States, and a resident of the city and county of Philadelphia, State of Pennsylvania, have invented certain new and useful Improvements in Machines for Facing Nuts, &c., of which the following is a specification.

My invention relates to improvements in machines for facing nuts or for performing analogous operations upon blanks or pieces of metal; and the object of my invention is to furnish a machine by means of which either or both the top and bottom faces of a nut may be automatically smoothed or faced or whereby substantially similar operations may be automatically performed upon other blanks or pieces of metal.

In the accompanying drawings, forming part of this specification, and in which similar characters of reference indicate similar parts throughout the several views, Figure 1 is a side elevation of my automatic nut-facing machine; Fig. 2, a front elevation of Fig. 1; Fig. 3, a section of Fig. 1 on line A B; Fig. 4, a side elevation of the inner face of one of the sides of the reciprocating carriage; Fig. 5, a section of Fig. 4 on line C D.

$a$ $a'$ are the end frames of the machine, which carry the guiding-plates $b$ $c$.

$d$ is a reciprocating carriage preferably constructed in two pieces $e f$, as best shown in Fig. 3, which is furnished with passages $g h$ for the nut-blanks, one half of said passages being formed in the piece $e$, the other half in the piece $f$. The carriage $d$ is guided by the guiding-plates $b$ $c$ and is free to move to and fro therein.

$i$ represents pins, one upon each side of carriage $d$, to which one end of rods $j$ are pivotally secured, the other ends of said rods being secured to cranks or eccentrics $k$ on a shaft $l$, carried by frame $a$.

$m n$ are gear-wheels, fast to shaft $l$, which gear with gears $o p$, fast to a shaft $r$, which carries a pulley $s$, which is driven by a belt (not shown) from any suitable and convenient source of power. Through the revolutions of pulley $s$ and the intermediate gearing and connections the carriage $d$ is caused to reciprocate in the guide-plates $b$ $c$.

$t$ is a tube connected with any suitable hopper, (not shown,) through which the nut-blanks are fed down to the passage $g$ in carriage $d$.

$u$ is a longitudinally-adjustable stationary rod or stop carried by frame $a$, the longitudinal axis of which is in or substantially in line with the longitudinal axis of the passage $g$ and which is of less cross-sectional area than the passage, so that it can pass therein.

$v$ is a spindle carried by frame $a'$ and axially in line with passage $g$. This spindle is adapted to carry and revolve a tool $w$, which faces the nut or performs an analogous operation upon the protruding blank carried by passage $g$.

1 is a longitudinally-adjustable stationary rod or stop carried by frame $a'$, which is placed opposite to and which is adapted to enter the passage $h$ in carriage $d$.

2 is a spindle carried by frame $a$, which is axially concentric with the passage $h$.

3 is a tool carried by spindle 2, adapted to operate upon the projecting face of a nut or other article carried by passage $h$.

4 is a basket carried by carriage $d$, which directs nuts falling from passage $g$ to the passage $h$.

5 is a shaft carrying a pulley 6 and pinions 7 8, which gear with gears 9 10, the former fast to the shaft $v$, the latter fast to shaft $l$, which carry the revolving facing or cutting tools.

The pulleys $s$ 6 being driven by belts in the usual manner, the blanks are fed down through tube $t$ into a vertical opening 11 in carriage $d$, which connects with the horizontal passage $g$ therein. When the interior of tube $t$ and opening 11 are in line, the carriage is at the end of its forward stroke and the rod $u$ is in the position shown in Fig. 1—that is, its outer end is within the passage and is engaging the last blank therein and closes off the lower end of the opening 11. As the shaft $k$ revolves the rod $j$ pushes the carriage backward and advances its rear end toward the facing or cutting tool $w$. Just before this tool is reached the carriage $d$ has been moved far enough backward to permit the opening 11 to clear the end of rod $u$. When the blank carried by this opening falls into the passage $g$, forming with the other blanks in this passage and the rod $u$ a continuous rigid bar, the outer end of the outer blank, which projects somewhat beyond the end of the carriage, is engaged by the revolving tool w and is faced or otherwise operated upon. As the motion of the carriage is reversed by a further revolution of shaft k, the forward nut of the line of nuts in passage g is engaged by rod u, and the outer nut, the one that has just been operated upon, is pushed out of passage g and falls into basket or cage 4, which directs it to the passage h, into which it is pushed by the rod 1 when the carriage is moved backward. When the carriage is moved forward, the nut in the forward end of passage h and which projects out beyond the end of the carriage is engaged and faced by the revolving tool 3. When the carriage is again moved backward, this nut is through the line of nuts in passage h and rod 1 pushed out of the passage and falls down and out of the machine.

It will be seen that the operation of the machine is continuous, one side of one nut being faced upon the completion of the backward stroke of the carriage and the other side of another nut upon the completion of the forward stroke of the carriage.

If it be desired to face but one side of the nut, but one passage in the carriage and one cutting-tool would be used.

As has been intimated, the machine may not only be used for facing nuts, but for performing any other analogous operation upon nut-blanks or other blanks or pieces of metal.

The carriage d is preferably formed in two pieces, as shown, for ease of tooling the passages g h, &c. Its lower end runs in guides 12 13, carried on the plate c, which guides are adjustable by means of screws 14. By setting the guides 12 13 in or out the carriage may be raised or lowered or moved from side to side, so as to bring the center lines of the passages g h directly in line with the center line of the spindles $v^2$ and the cutting-tools carried by them. The two parts of the carriage d are held together by bolts 15, and by setting up the nuts carried by these bolts the two sides of the carriage can be brought together, so as to bear tightly against the nuts in the passages g h, preventing any movement of the nuts when being operated upon by the cutting-tools, but not holding them so tightly that they cannot be moved by the rods u 1 when the carriage is reciprocated. The ends of the passages g h, to which the nut-blanks are first fed, are sufficiently large in section to permit the easy entrance of the blanks, which are not necessarily gripped by the sides of the passages until they get close to the ends adjacent to the cutting-tools.

The inner ends of the rods u 1 are threaded and screwed into the frames a a'. They are both equipped with jam-nuts 16 to hold them in place when they have been properly adjusted for the work in hand.

Having thus described my invention, I claim as new and desire to secure by Letters Patent—

1. In a machine for facing nuts, &c., in combination, a reciprocating carriage adapted to carry the nuts to be operated upon, means for guiding and means for reciprocating said carriage, a revolving cutter, and a stationary rod adapted upon the movement of said carriage away from said cutter to force the nut that has been faced out of said carriage and the next nut into position to be engaged by said cutter upon the forward stroke of said carriage.

2. In a machine for facing nuts, &c., in combination, a reciprocating carriage furnished with a passage passing longitudinally through it for carrying the nuts to be operated upon, means for carrying and means for reciprocating said carriage, means for feeding the nut-blanks to said passage, a revolving cutter adapted to engage said nut-blanks successively, and a rod adapted to enter said passage in said carriage at the end farthest away from said cutter and upon the movement of said carriage away from said cutter to force the nut that has been faced out of said passage and the next adjacent nut into position to be operated upon.

3. In a machine for facing nuts, &c., in combination, a reciprocating carriage furnished with two longitudinal passages placed one above the other, passing completely through it, said passages being adapted to each carry a series of nuts, means for carrying and means for reciprocating said carriage, a rotating cutter opposite the rear end of the upper passage, a rotating cutter opposite the front end of the lower passage, means for feeding nuts one at a time to said upper passage, means for advancing said nuts one at a time to the rear end of said upper passage and for forcing them therefrom after being operated upon, means for directing said nuts to said lower passage, and means for forcing said nuts through said lower passage, one at a time, so that their unfaced faces will be brought into contact with said second cutter.

4. In a machine for facing nuts, &c., in combination, a reciprocating carriage furnished with a passage extending longitudinally through it and with a vertical passage connecting with said longitudinal passage, a feeding-tube connected with said vertical passage, means for carrying and means for horizontally reciprocating said carriage, a fixed rod or stop entering one end of said horizontal passage, a rotating cutter opposite the other end of said passage, and means for carrying and means for driving said cutter.

5. In a machine for facing nuts, &c., in combination, a reciprocating carriage furnished with two longitudinal passages, one above the other, each adapted to carry a series of nuts and with a vertical passage connecting with the top of the upper horizontal passage, means for carrying and means for longitudinally reciprocating said carriage, a feeding-tube connecting with said vertical passage, an adjustable rod or stop entering one end of the upper longitudinal passage, an adjustable rod or stop entering the opposite end of the lower passage, a cutting-tool opposite the open end of the lower passage, means for carrying and means for rotating said tools, and means for carrying the faced nuts from the upper passage to the lower passage.

6. In a machine for facing nuts, &c., in combination, a reciprocating carriage furnished with a horizontal passage adapted to contain a series of nuts, means for carrying and means for reciprocating said carriage, means for feeding a nut to the passage in said carriage during the time that said carriage makes one complete reciprocation, a stationary rod adapted to enter one end of the passage in said carriage, and a revolving cutting-tool opposite the other end of said passage, the longitudinal axis of said rod, passage and tool being upon the same line.

7. The combination with the reciprocating carriage furnished with two superposed longitudinal passages as described, of means for facing one end of a nut while held by said carriage in said upper passage, means for forcing said nut out of the upper passage after being faced, a basket or cage for carrying said nut opposite the end of said lower passage, means for forcing said nut through said lower passage, and means for facing the other end of said nut while held by said carriage in said lower passage.

CHARLES W. JAMES.

Witnesses:
GEORGE W. SELTZER,
CHARLES A. RUTTER.